US006594853B1

United States Patent
Igarashi

(10) Patent No.: US 6,594,853 B1
(45) Date of Patent: Jul. 22, 2003

(54) WIPER APPARATUS FOR MOTOR VEHICLES

(75) Inventor: Yuji Igarashi, Ohta (JP)

(73) Assignee: Mitsuba Corporation, Gunma-Ken (JP)

( * ) Notice: Subject to any disclaimer, the term of this patent is extended or adjusted under 35 U.S.C. 154(b) by 310 days.

(21) Appl. No.: 09/629,880

(22) Filed: Aug. 1, 2000

(30) Foreign Application Priority Data

Aug. 5, 1999 (JP) ............................. 11-222672

(51) Int. Cl.$^7$ ................................. B60S 1/06
(52) U.S. Cl. ................. 15/250.31; 15/250.3; 403/2; 403/DIG. 3; 74/42; 384/624; 384/903
(58) Field of Search ............... 15/250.3, 250.31, 15/250.27, 250.34; 74/42, 43; 296/96.17; 403/2, DIG. 3; 384/624, 903

(56) References Cited

U.S. PATENT DOCUMENTS 6,237,185 B1 * 5/2001 Goto et al. ............ 15/250.31
6,317,918 B1 * 11/2001 Kagawa et al. .......... 15/250.31
6,347,427 B2 * 2/2002 Kobayashi et al. ...... 15/250.31

FOREIGN PATENT DOCUMENTS

JP            11-124013            5/1999

* cited by examiner

*Primary Examiner*—Robert J. Warden, Sr.
*Assistant Examiner*—Laura C Cole
(74) *Attorney, Agent, or Firm*—Oliff & Berridge, PLC

(57) ABSTRACT

A wiper apparatus for a motor vehicle comprising a sleeve secured to a vehicle body side and a pivot shaft which is supported rotatably in the sleeve. The proximal portion of the pivot shaft relative to the interior side of the vehicle is connected to a drive source. The tip portion of the pivot shaft holds a wiper arm on the exterior side of the vehicle. For the pivot shaft to depress toward the vehicle's interior side with respect to the sleeve, a load exceeding a predetermined value works axially on the pivot shaft from the vehicle's exterior side. A depression preventing member is interposed between the pivot shaft and the sleeve and is deformed when receiving the load that depresses the pivot shaft. A deformation space is secured between the pivot shaft and the sleeve enabling the depression preventing member to deform smoothly in response to the load.

10 Claims, 4 Drawing Sheets

Tip side

Base side

Tip side

Base side

WIPER APPARATUS FOR MOTOR VEHICLES

BACKGROUND OF THE INVENTION

1. Field of Invention

The invention relates to a wiper apparatus for mounting upon motor vehicles, such as passenger cars, buses and trucks.

2. Description of Related Art

In general, a motor vehicle is provided with a wiper apparatus to wipe a window surface such as a windshield. The conventional wiper apparatus comprises a pivot shaft fitted to a sleeve and mounted on a vehicle body side, which shaft is rotatable around its axis. The proximal portion of the pivot shaft is coupled to a link mechanism of a wiper motor serving as a drive source for a wiper arm. The wiper arm is fixedly secured to the tip portion of the pivot shaft and swings for wiping the window surface. Another type of wiper apparatus protrudes the wiper arm and tip portion of the pivot shaft outwardly from the vehicle body side. This latter type poses the problem of directly receiving impacts from external sources resulting in the wiper apparatus breaking down, deforming or otherwise suffering serious damage.

Accordingly, as disclosed in JP-A-11-124013, there has been proposed a motor vehicle wiper apparatus structure in which a brittle portion is included in a depression preventing member, such as a washer, for preventing the pivot shaft from depressing or sinking toward the interior of the motor vehicle with respect to the sleeve. With this arrangement the brittle portion is broken down or sheared, as shown in FIGS. 8 and 9 of the aforesaid publication, or the depression preventing member is deformed to cause the pivot shaft to depress toward the vehicle's interior side, as shown in FIG. 6 of the aforesaid publication, when a load from outside the motor vehicle exceeds a predetermined value and works on the tip portion of the pivot shaft. The effect is a reduction of impact load upon the wiper apparatus.

However, in JP-A-11-124013, in the case of the breakdown of the brittle portion of the depression preventing member, naturally a large stress (shearing force) operates at the moment of the breakdown, which decreases the effect of reducing damage such as breakdown.

In the case of a construction which makes use of the deformation of the depression preventing member, a large stress does not operate instantaneously unlike the case of the breakdown. This type of arrangement as shown in FIG. 4, includes a stopping groove 14 which is formed in a pivot shaft 13 supported rotatably by a sleeve 12, and a tip portion 16a of a slip-out preventing member (bracket piece) 16 which is fixed by a bolt through a rubber vibration insulator 15 to the body side is inserted into the stopping groove 14. Thus, when a load acts on the pivot shaft 13 from the outside in an axial direction, the direction of the load is in the axial direction of the pivot shaft 13, but is not in a radial direction thereof in which the depression preventing member tip portion 16a can move out of the stopping groove 14. Accordingly, the depression preventing member tip portion 16a is bent locally by an edge portion 14a of the stopping groove 14 with the stopping groove edge portion 14a biting into the edge portion 16a. Then the depression preventing member tip portion 16a is drawn over the stopping groove edge portion 14a and disengages from the stopping groove 14. Thus, not only does a considerable load result, but also difficulty is experienced in controlling this load constantly so that differences among product occur, thereby decreasing the effectiveness of reducing damage such as breakdown. This invention aims to solve these problems.

SUMMARY OF THE INVENTION

The invention has been developed in consideration of the above-stated situations and to reduce the likelihood of the problems cited. In accordance with this invention, there is provided a wiper apparatus for a motor vehicle, comprising a sleeve fixedly secured to a vehicle body and a pivot shaft which is supported rotatably in the sleeve wherein the base portion of the pivot shaft is connected to a drive source. The tip portion of the pivot shaft is on the vehicle's exterior side and holds a wiper arm. For the pivot shaft to be depressed toward the vehicle's interior side with respect to the sleeve, a load exceeding a predetermined value works axially on the pivot shaft from the vehicle's exterior side. A depression preventing member is interposed between the pivot shaft and the sleeve and is deformed when receiving the load that depresses the pivot shaft. A deformation space is secured between the pivot shaft and the sleeve for enabling the deformation of the depression preventing member to occur smoothly.

With this structure, the depression of the pivot shaft is achieved by the smooth deformation of the depression preventing member, which relieves damages such as a breakdown.

The deformation space can be secured between the pivot shaft and the sleeve with room enough to include a bearing bush whereupon, for securing the deformation space, it is possible to use the bearing bush space directly so that an increase in deformation space size is avoidable.

In addition, an inner circumferential portion of the depression preventing member is fitted in a stopping groove made in the pivot shaft, while an outer circumferential portion thereof is brought into contact with a tip portion of the sleeve. The stopping groove is made wide in an axial direction to constitute a portion of the deformation space. In consequence, deformation of the depression preventing member occurs as the depression preventing member is brought into contact with two points, namely, the tip portion of the sleeve and the vehicle's exterior side end portion of the stopping groove. This results in deformation of the depression preventing member occurring smoothly while a local bending is avoided, thereby reducing damage to the wiper apparatus.

BRIEF DESCRIPTION OF THE DRAWINGS

The object and features of the invention will become more readily apparent from the following detailed description of the preferred embodiment, taken in conjunction with the accompanying drawings, in which.

DETAILED DESCRIPTION OF PREFERRED EMBODIMENTS

Figure 1:
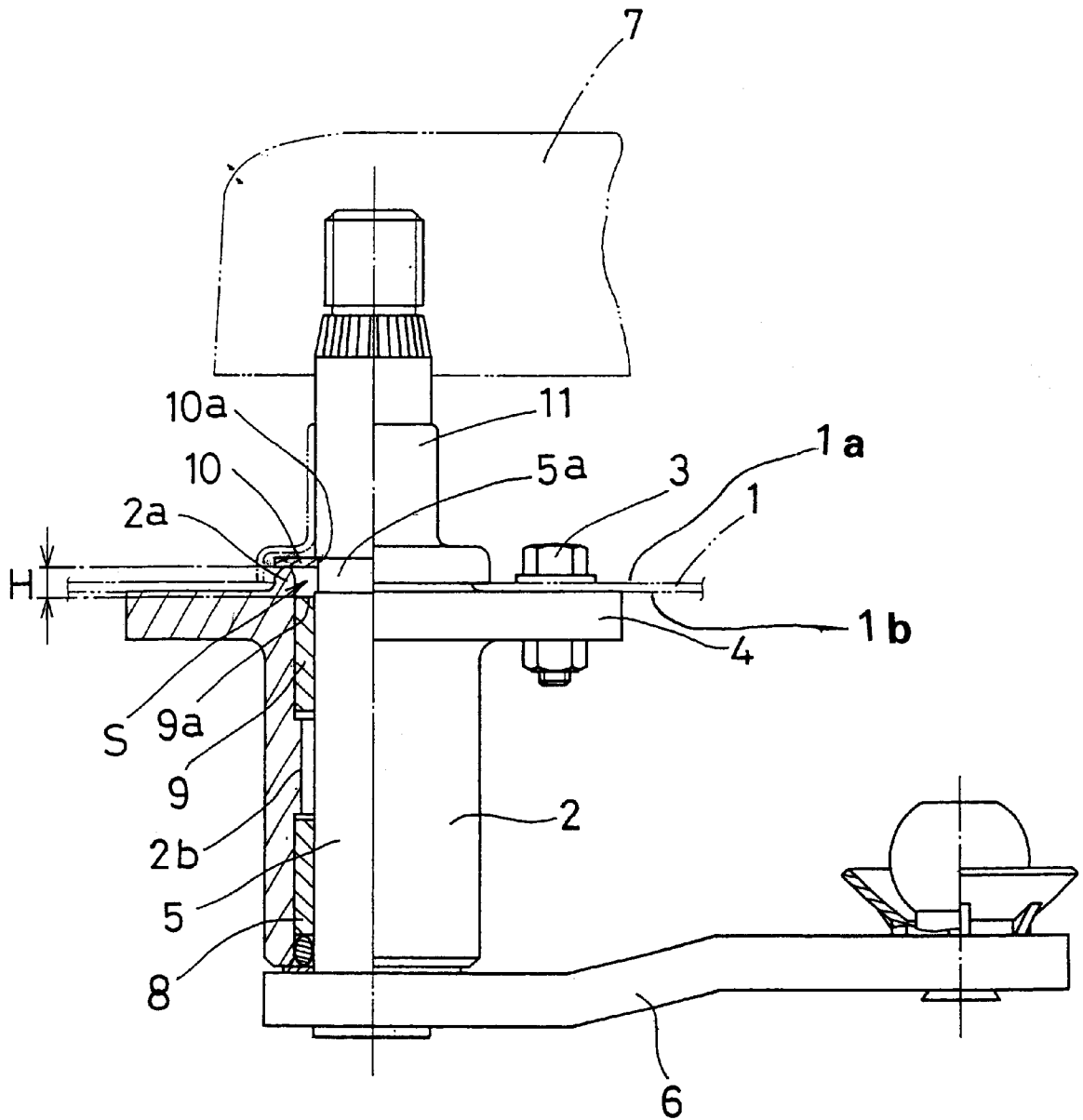
FIG. 1 is a partially cross-sectional and front elevational view showing a pivot shaft section of a wiper apparatus according to this invention, which is in an ordinary use condition.
Figure 2:
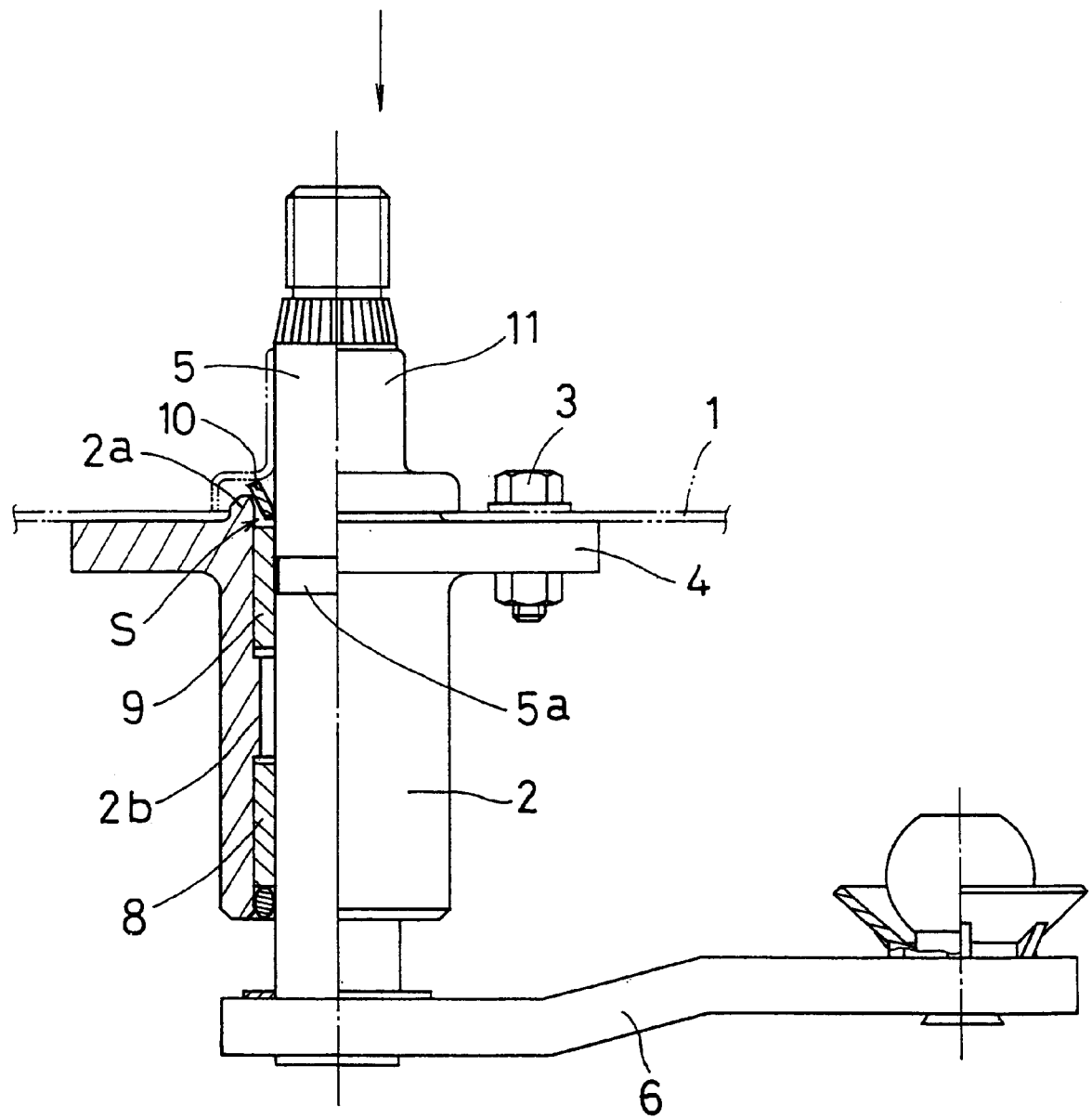
FIG. 2 is a partially cross-sectional and front elevational view showing a pivot shaft section of the wiper apparatus according to this invention, which is in a depressed condition.

An embodiment of the invention will be described hereinbelow with reference to the drawings.

Reference numeral 1 designates a vehicle body panel having an exterior side 1a and an interior side 1b for a motor vehicle, and a sleeve 2 organizing a wiper apparatus according to this invention. The sleeve 2 is mounted on the vehicle body panel 1 in this embodiment, however, the mounting place of the sleeve 2 is not limited to the vehicle body panel 1. It is also possible that the sleeve 2 is mounted on a rear windshield for purposes of this invention. The sleeve 2 has a cylindrical configuration and is equipped with a flange section 4 formed at its tip portion in the axial direction. This flange section 4 is for fixedly attaching the sleeve 2 using bolts 3 to the vehicle body panel 1. In addition, in the sleeve 2, a protruding cylinder section 2a is formed to penetrate the vehicle body panel 1 and protrudes therefrom toward the vehicle's exterior side 1a when the sleeve 2 is fixedly attached to the vehicle body panel 1.

Reference numeral 5 represents a pivot shaft which penetrates the sleeve 2. As in the conventional art, a link arm 6 is fixedly secured to the base side of the pivot shaft while a wiper motor, not shown, is interlocked with the link arm 6. Further, a wiper arm 7 is fixed to the tip side of the pivot shaft 5 protruding toward the vehicle's exterior side 1a. In accordance with the drive of the wiper motor, the wiper arm 7 swings to wipe a window surface.

Reference numerals 8 and 9 denote resin-made bush bearings intervening between an inner cylinder surface of the sleeve 2 and an outer circumferential surface of the pivot shaft 5. The bush bearings 8, 9 are inserted into the sleeve 2 under a low pressure, and inner circumferential surfaces thereof are made to be slidable on the outer circumferential surface of the pivot shaft 5. The bush bearings 8, 9 are allocated to a base side and a tip side, respectively, of the smaller-diameter section 2b made in the inner cylindrical surface of the sleeve 2, thus supporting the pivot shaft 5 at two surfaces. An upper portion 9a of bush bearing 9 is positioned to be depressed by a distance H toward the vehicle's interior side 1b with respect to the uppermost portion of the protruding cylinder section 2a. This uppermost portion of protruding cylinder section 2a forms a deformation space S for the bush bearing 9, as will be described later.

Figure 3:
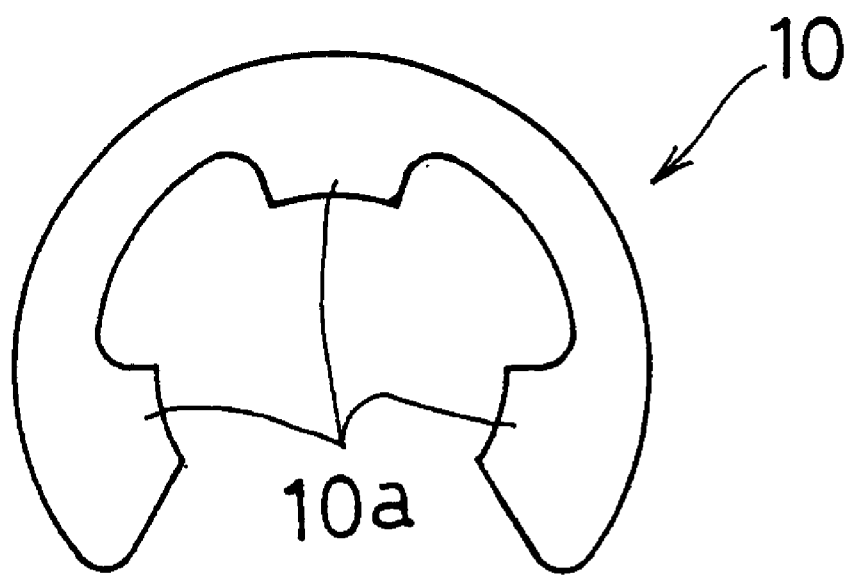
FIG. 3 is a front elevational view showing a washer for prevention of depression.
Figure 4:
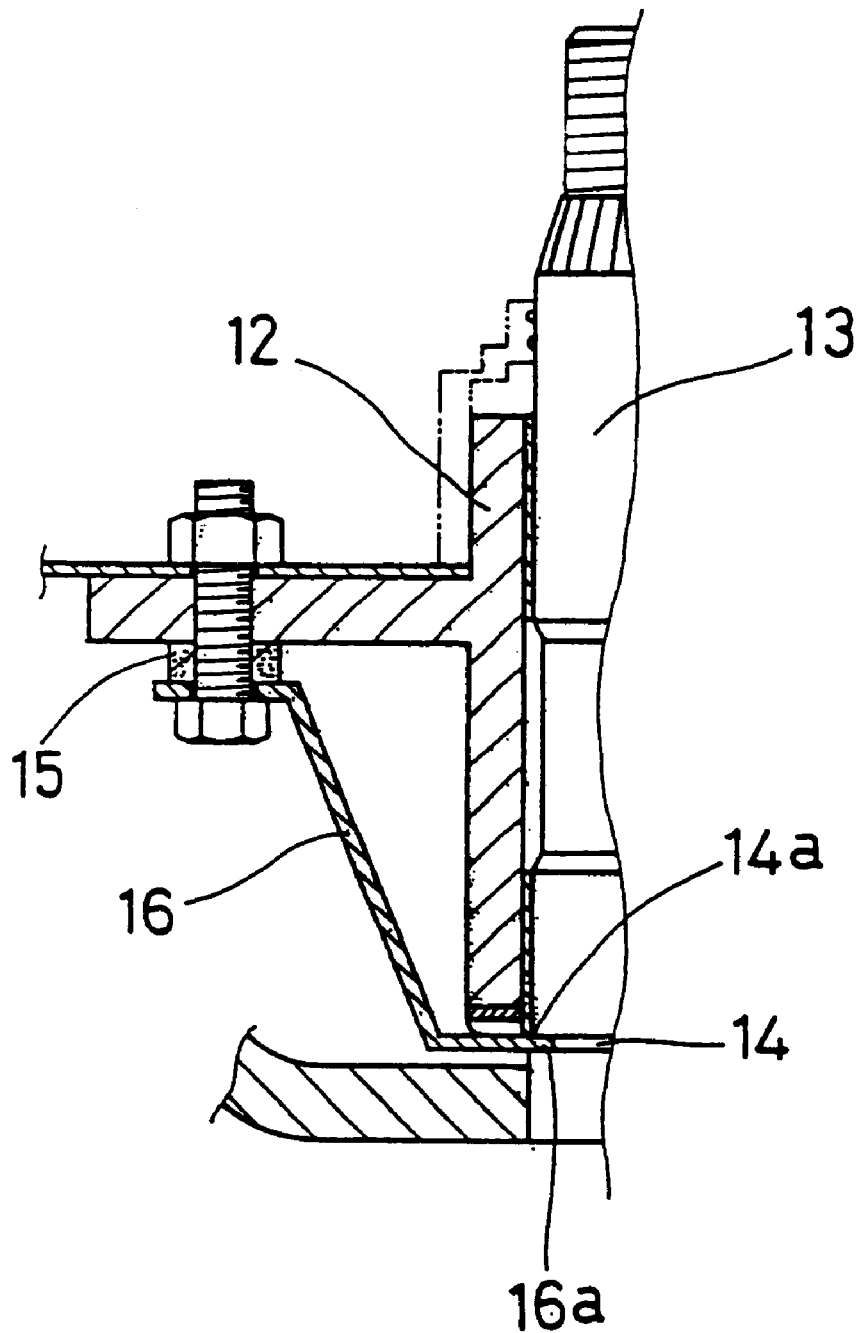
FIG. 4 is a partially cross-sectional and front elevational view showing a conventional example.

Reference numeral 10 depicts a depression preventing washer for preventing the depression of the pivot shaft 5 toward the vehicle's interior side with respect to the sleeve 2. In this embodiment, as shown in FIG. 3, the washer 10 has a ring-like configuration in which a portion of its outer circumferential section is cut off or notched. This type of washer 10, known as an E-washer, has stopping claws 10a formed at a predetermined interval on its inner circumferential surface. In addition, the washer 10 is made such that its outer circumferential section is brought into contact with an uppermost portion of the protruding cylinder section 2a relative to the vehicle's exterior side. The stopping claws 10a are fitted into a stopping or locking groove 5a made in the pivot shaft 5 so that they are stopped or locked therein for restricting the movement of the pivot shaft 5 toward the vehicle's interior side. Notably, this stopping groove 5a is formed to be wide on the vehicle's interior side to constitute thereby a portion of the aforesaid deformation space S. This configuration serves to additionally enlarge the deformation space S. Reference numeral 11 signifies a water proof cap for covering the washer 10 section of the sleeve 2.

In the above structure, when a load exceeding a predetermined value works axially on the pivot shaft 5 from the vehicle's exterior side, the washer 10 is deformed such that its inner circumferential section is shifted toward the vehicle's interior side, i.e., it is deformed into a generally conical washer configuration. At this time, the notched portion of the washer 10 is opened so that the washer 10 slips out from the pivot shaft 5, whereupon, the pivot shaft 5 and the sleeve 2 are released from their depression prevention relation, and the pivot shaft 5 is depressed toward the vehicle's interior side. This results in an impact absorption function by the wiper apparatus. Additionally, the deformation of the washer 10 is made in the deformation space S secured between the pivot shaft 5 and the sleeve 2. Consequently, a smooth washer deformation is achievable that prevents the washer 10 from being damaged. Damages such as a breakdown are also reduced when the pivot shaft 5 receives a load axially.

Because the deformation space S is secured by dually using the space designated for bush bearing 9 by locating that space between the pivot shaft 5 and the sleeve 2, it is possible to minimize the size of the sleeve. Further yet, no obstacles exist in the deformation space because a portion of the deformation space S is obtained due to the wideness of the pivot shaft stopping groove 5a, and because of the washer's 10 outer circumferential section contact with the uppermost portion of the sleeve 2 from the vehicle's interior side. The washer is thus deformed by receiving a load where its inner circumferential section comes into contact with the stopping groove 5a from the vehicle's exterior side to establish a two-point supporting structure. Accordingly, this allows the deformation stress of the washer 10 to reduce the differences between predetermined load values for the deformation of the washer 10.

The water proof cap 11 minimizes the risk of losing the deformed washer 10 that has slipped out from the pivot shaft 5 and permits the retrieval thereof the washer.

It should be understood that the foregoing relates to only a preferred embodiment of the invention, and that it is intended to cover all changes and modifications of the embodiment of the invention herein used for the purpose of the disclosure, which do not constitute departures from the spirit and scope of the invention.

What is claimed is:

1. A wiper apparatus for a motor vehicle, comprising:
   a sleeve fixedly secured to a vehicle body panel having an exterior and interior side;
   a pivot shaft having a tip side and a base side, which is supported rotatably in the sleeve and which is connected to a drive source on its base side on the vehicle's interior side and holds a wiper arm on its tip side on the vehicle's exterior side, wherein the pivot shaft is depressible toward the vehicle's interior side with respect to the sleeve when a load exceeding a predetermined value works axially on the pivot shaft from the vehicle exterior side;
   a depression preventing member interposed between the pivot shaft and the sleeve which is deformed when receiving said load; and
   a deformation space secured between the pivot shaft and the sleeve for accommodating the deformation of substantially the entire depression preventing member.

2. The wiper apparatus for a motor vehicle according to claim 1, wherein the deformation space houses at least one bush bearing intervening between the pivot shaft and sleeve.

3. The wiper apparatus for a motor vehicle according to claim 2, wherein an inner circumferential portion of the depression preventing member is fitted in a stopping groove made in the pivot shaft, and an outer circumferential portion thereof is brought into contact with an uppermost portion of the sleeve.

4. The wiper apparatus for a motor vehicle according to claim 3, wherein the stopping groove is wide in its axial direction to contribute to the deformation space.

5. A motor vehicle wiper apparatus, comprising:
- a sleeve, fixedly secured to a vehicle body panel, for housing a pivot shaft;
- an axially depressible pivot shaft extending through the sleeve and having a tip side and a base side;
- a drive source connected to the base side of the pivot shaft;
- a wiper arm connected to the tip side of the pivot shaft;
- a deformation space between the pivot shaft and the sleeve permitting axial movement of the pivot shaft under a load;
- at least one bush bearing about the pivot shaft and within the deformation space for providing a smooth transition of the pivot shaft undergoing axial movement; and a deformable depression preventing member interposed between the pivot shaft and the sleeve at their tip sides respectively, substantially the entire deformable depression preventing member deforms into the deformation space when the pivot shaft is under a load.

6. The motor vehicle wiper apparatus of claim 5, further comprising a flange at an uppermost portion of the sleeve for securing the sleeve to the vehicle body panel via connecting bolts.

7. The motor vehicle wiper apparatus of claim 5, wherein the pivot shaft includes a stopping groove made integral therewith for receiving at least a portion of the depression preventing member.

8. The motor vehicle wiper apparatus of claim 7, wherein the stopping groove is made wide along at least one of its sides to contribute to the deformation space.

9. The motor vehicle wiper apparatus of claim 8, wherein the deformable depression preventing member comprises an open-prong washer having its inner circular surface contacting the pivot shaft and its outer circular surface contacting the sleeve during deformation.

10. The motor vehicle apparatus of claim 5, further comprising a waterproof cap atop the depression preventing member and exterior of the vehicle body panel.

* * * * *